United States Patent Office 2,794,793
Patented June 4, 1957

2,794,793

COPOLYMERIZATION OF ETHENOID MONOMERS IN THE PRESENCE OF POLYACRYLONITRILE

Harry W. Coover, Jr., Kingsport, Tenn., assignor to Eastman Kodak Company, Rochester, N. Y., a corporation of New Jersey No Drawing. Application October 21, 1952, Serial No. 316,059

5 Claims. (Cl. 260—45.5)

This invention relates to the copolymerization of two different monomers in the presence of preformed polyacrylonitrile, and to articles prepared therefrom.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 percent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these nonhomogeneous solutions or mixtures of polyacrylonitrile and poylvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

I have now made the unusual and valuable discovery that stable solutions of acrylonitrile polymers which do not separate into distinct layers on standing, and from which fibers of homogeneous character can be spun, can be prepared by polymerizing certain monoethylenically unsaturated, polymerizable monomers in the presence of preformed polyacrylonitrile; i. e., polyacrylonitrile which has not been separated from its polymerization reaction mixture prior to the addition of the polymerizable monomer. These fibers are characterized by a softening point higher than the interpolymers referred to above, and do not exhibit the segmentation defect shown by many of the fibers prepared from certain prior art materials comprising polyacrylonitrile.

It is, therefore, an object of my invention to provide acrylontrile polymer compositions. A further object of my invention is to provide methods for making these modified polymer compositions. Still another object is to provide homogeneous solutions obtained from these polymer compositions comprising acrylonitrile. Another object is to provide fibers from these homogeneous solutions, and methods for making these fibers. Other objects will become apparent hereinafter.

According to my invention, I provide polymer compositions comprising acrylonitrile by copolymerizing a monomer selected from the group consisting of acrylamides, maleamides, fumaramides, itaconamides, citraconamides, maleamates, fumaramates, etaconamates, citroconamates, acrylates and vinyl carboxylic esters and another monoethylenically unsaturated, polymerizable compound containing a

I.                      —CH=C< group in the presence of preformed polyacrylonitrile which has not been separated from its polymerization medium prior to the addition of the monomers. When the preformed polyacrylonitrile is separated from its polymerization medium, and redissolved in a solvent, or suspended in an aqueous medium, all of the reactive groups in the polymer chain are apparently closed, or rendered inactive, and polymerization of the monomers with this separated polyacrylonitrile gives a product having a substantially lower softening point than is the case when the unseparated polyacrylonitrile is employed as in the invention. When the monomers are added to the preformed polyacrylontrile before separation of the polymer from its reaction mixture, a certain number of groups in the polymer chain apparently remain reactive, and the monomers are able to increase the length of the polymer chain. The compositions obtained according to my invention are not, therefore, to be confused with simple interpolymers which have a low softening point as has been noted above.

The polymer compositions of my invention contain from 5 to 95 percent by weight of acrylonitrile and from 95 to 5 percent by weight of the mentioned monomers. Those of my compositions containing from about 60 to 95 percent by weight of acrylonitrile have been found to be especially useful as fiber-forming materials. However, all of the compositions in the 5 to 95 percent range of acrylonitrile are compatible with each other, with polyacrylonitrile or with other acrylonitrile polymers, containing 85 percent or more by weight of acrylonitrile, in all proportions, but the most useful mixtures are from 5 to 95 parts by weight of one or more of the polymers or compositions of the invention with from 95 to 5 parts by weight of polyacrylonitrile. Monomers whose polymers were not heretofore compatible with polyacrylonitrile can thus be polymerized according to my invention to give polymers which are highly compatible with polyacrylonitrile.

The acrylamides whose polymers can be advantageously used in my invention comprise those represented by the following general formula:

II.
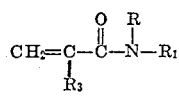

wherein R and $R_1$ each represents a hydrogen atom or an alkyl group containing from 1 to 4 carbon atoms (e. g. methyl, ethyl, propyl, isopropyl, butyl, isobutyl, etc. groups) and $R_3$ represents a hydrogen atom or a methyl group. Typical acrylamides include acrylamide, N-methyl acrylamide, N-ethyl acrylamide, N-isopropyl acrylamide, N-n-butyl acrylamide, methacrylamide, N-methyl methacrylamide, N-ethyl methacrylamide, N-isopropyl methacrylamide, N,N-dimethyl acrylamide, N,N-diethyl acrylamide, N,N-dimethyl methacrylamide, ethacrylamide, N-methyl ethacrylamide, α-propyl acrylamide, N-methyl α-butyl acrylamide, etc.

As maleamides, I can advantageously use those represented by the following general formula:

III.
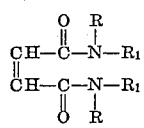

wherein R and $R_1$ are as above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, I can advantageously use those represented by the following general formula:

IV.
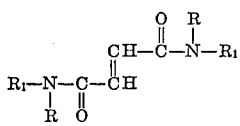

wherein R and $R_1$ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butyl fumaramide, N,N'-tetramethyl fumaramide, N,N'-tetraethyl fumaramide, N,N-dimethyl-N',N'-diethyl fumaramide, etc.

As itaconamides, I can advantageously use those represented by the following general formula:

V.
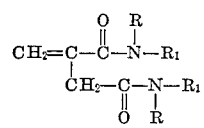

wherein R and $R_1$ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamide, N,N'-tetramethyl itaconamide, etc.

As citraconamides, I can advantageously use those represented by the following general formula:

VI.
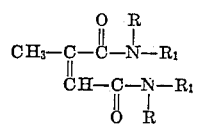

wherein R and $R_1$ are as above defined. Typical citraconamides include citraconamide, N-methyl citraconamide, N-ethyl citraconamide, N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers I can advantageously use comprise those represented by the following general formula:

VII.
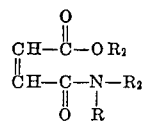

wherein R and $R_1$ are as above defined and $R_2$ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, I can advantageously use those represented by the following general formula:

VIII.
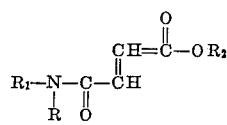

wherein R, $R_1$ and $R_2$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, I can advantageously use those represented by the following general formulas:

IX.
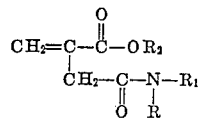

and

X.
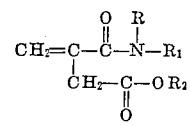

wherein R, $R_1$ and $R_2$ are as above defined. Typical itaconamates include methyl itaconamate, ethyl itaconamate, propyl itaconamate, the butyl itaconamates, N-methyl ethyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

As citraconamates, I can advantageously use those represented by the following general formulas:

XI.
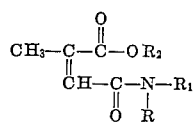

and

XII.
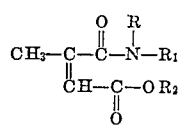

wherein R, $R_1$ and $R_2$ are as above defined. Typical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The acrylates whose polymers I can advantageously use comprise those represented by the following general formula:

XIII.
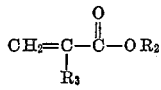

wherein $R_2$ and $R_3$ are as above defined. Typical esters include methyl acrylate, ethyl acrylate, propyl acrylate, n-butyl acrylate, isobutyl acrylate, methyl methacrylate, ethyl methacrylate, propyl methacrylate, the butyl methacrylates, etc.

As vinyl carboxylic esters, I can advantageously use those represented by the following general formula:

XIV.
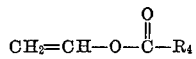

wherein $R_4$ represents an alkyl group containing from 1 to 3 carbon atoms. Typical esters include vinyl formate, vinyl acetate, vinyl propionate, vinyl butyrate, etc.

The monoethylenically unsaturated, polymerizable organic compounds represented by Formula I above include the compounds represented by Formulas III to XIV, in addition to other monomeric compounds coming within the scope thereof, such as styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, methacrylonitrile, N-vinyl phthalamide, vinyl butyrate, vinyl sulfonamide, ethylene, isobutylene, etc. Especially useful polymerizable compounds coming within the scope of Formula I comprise compounds containing a XV. 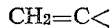

group and an amido nitrogen atom, for example, the acrylamides.

In preparing the resinous compositions of the invention from 5 to 95 parts by weight of acrylonitrile in aqueous dispersion or solution and with added polymerization catalyst is heated until the acrylonitrile has substantially completely homopolymerized, then without separating the homopolymer from the polymerization reaction mixture there is added to the reaction mixture from 95 to 5 parts by weight of a mixture of monomers consisting of from 1 to 99, but preferably from 5 to 95, percent by weight of a monomer selected from a group consisting of the defined acrylamides, maleamides, fumaramides, itaconamides, citraconamides, maleamates, fumaramates, itaconamates, citraconamates, acrylates and vinyl carboxylic esters, and from 99 to 1, but preferably from 95 to 5, percent by weight of a different monomer selected from the monoethylenically unsaturated, polymerizable organic compounds, and the heating continued until the added monomers have substantially polymerized; i. e., until from about 90 to 100 percent of added monomers have completely polymerized.

The polymerizations are advantageously carried out in aqueous medium, although other reaction media such as organic solvents can be employed. The term dispersion herein is intended to include both true solutions and emulsions in aqueous or nonaqueous media. For example, a polymerization medium consisting of aqueous acetone or other aqueous solvent can also be used. The polymerizations can be accelerated by the use of a well-known polymerization catalyst. Such catalysts are commonly used in the art of polymerization, and my invention is not to be limited to any particular catalyst material. Catalysts which have been found to be especially useful comprise the peroxide polymerization catalysts such as organic peroxides (e. g. benzoyl peroxide, acetyl peroxide, acetyl benzoyl peroxide, lauryl peroxide, oleoyl peroxide, triacetone peroxide, urea peroxide, tert. butyl hydroperoxide, alkyl percarbonates, etc.), hydrogen peroxide, perborates (e. g. alkali metal perborates such as sodium and potassium perborates, ammonium perborate, etc.), persulfates (e. g. alkali metal persulfates, ammonium persulfate, etc.). Other catalysts such as the ketazines, azines, etc. can also be used. The quantity of catalyst used can be varied depending on the monomers, amount of diluent, etc. Sufficient catalyst can be used to homopolymerize the acrylonitrile and the added monomers, or an amount of catalyst sufficient to polymerize only the acrylonitrile can be used, and then additional catalyst can be added at the time the modifying monomers are added to the polymerization mixture to complete the second step of polymerization. I have found that it is especially advantageous to employ the latter method. This procedure provides a readier means for regulating the molecular weight distribution of the polymer compositions.

The temperatures at which the process of our invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalene-sulfonate), alkali metal or amine addition salts of sulfo-succinic acid esters, alkali metal salts of fatty acids containing from 12 to 20 carbon atoms, sulfonated fatty acid amides, alkali metal salts of alkane sulfonic acids, sulfonated ethers, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The following examples will serve to illustrate further the manner whereby we practice our invention.

*Example 1*

7 grams of acrylonitrile were emulsified in 75 cc. of distilled water containing 3 grams of an aryloxypolysalkylene sulfonated ether type of emulsifying agent, 0.1 gram of sodium bisulfite and 0.1 gram of ammonium persulfate. The emulsion was then heated at 35° C. for 12 hours. There were then added 2.5 grams of N-methyl methacrylamide and 0.5 gram of acrylonitrile along with 0.05 gram of ammonium persulfate and 0.5 gram of sodium bisulfite. Polymerization was completed by heating at 35° C. for an additional 12 hours. The precipitated polymer was obtained in 85 percent yield and contained 24 percent by weight of N-methyl methacrylamide. Fibers spun by extruding a solution of the polymer product in N,N-dimethylformamide into a precipitating bath had a softening point of 210° C. and showed excellent affinity for dyes.

The polymer can be mixed with polyacrylonitrile in all proportions and dissolved to give stable solutions which do not separate into distinct layers on standing and from which fibers and films of homogeneous character can be spun, extruded or cast.

Example 2

7 grams of acrylonitrile were emulsified in 100 cc. of distilled water containing 3 grams of potassium laurate, 0.1 gram of potassium persulfate and 0.1 gram of sodium bisulfite. The emulsion was then heated at 35° C. for 8 hours. There was then added 1 gram of acrylonitrile and 2 grams of N-methylacrylamide along with 0.05 gram of potassium persulfate. Polymerization was completed by heating at 50° C. for an additional 12 hours. The precipitated polymer was obtained in a 90 percent yield and contained 18 percent by weight of N-methylacrylamide. Fibers spun by extruding a solution of the polymer product in N,N-dimethylformamide into a precipitating bath had a softening point of 220° C. and showed excellent dye susceptibility.

Example 3

8 grams of acrylonitrile were emulsified in 90 cc. of water containing 3 grams of 7-ethyl-2-methyl undecane-4-sulfonic acid sodium salt (Tergitol No. 4) and 0.1 gram (calculated as 100 percent) of hydrogen peroxide. The reaction mixture was heated for 16 hours at 50° C. The solution was cooled to room temperature and 1 gram of methacrylamide, 1 gram of N,N-dimethylacrylamide and 0.05 gram (calculated as 100 percent) of hydrogen peroxide and 0.5 gram of oxalic acid were added. Heating was then continued for an additional 16 hours at 50° C. The precipitated polymer was obtained in an 85 percent yield and contained 8 percent by weight of methacrylamide and 9 percent by weight of N,N-dimethylacrylamide. Fibers spun by extruding a solution of the polymer product in N,N-dimethylformamide into a precipitating bath had a softening point of 195° C. and showed excellent affinity for dyes.

Example 4

7.5 grams of acrylonitrile were emulsified in 100 cc. of distilled water containing 3 grams of an aryloxypolyalkylene sulfonated ether type of emulsifying agent, 0.1 gram of ammonium persulfate and 0.1 gram of sodium bisulfite. The emulsion was then heated at 40° C. for 8 hours, at the end of which time the solution was cooled to room temperature. There were then added 1 gram of N,N'-dimethylitaconamide, 1.5 grams of acrylamide, 0.05 gram of ammonium persulfate and 0.05 gram of sodium bisulfite. The polymerization was completed by heating at 40° C. for an additional 8 hours. The precipitated polymer was obtained in a 92 percent yield and contained approximately 9 percent by weight of N,N'-dimethylitaconamide and 12 percent by weight of acrylamide. Fibers spun by extruding a solution of the polymer product in N,N-dimethylformamide into a precipitating bath had a softening point of 220° C. and showed good affinity for dyes.

The polymer can be mixed with polyacrylonitrile in all proportions and dissolved to give stable solutions which do not separate into distinct layers on standing and from which fibers and films of homogeneous character can be spun, extruded or cast.

Example 5

7 grams of acrylonitrile were dissolved in 50 milliliters of N,N-dimethylformamide containing 0.1 gram of benzoyl peroxide. The reaction mixture was heated at 50° C. for 16 hours. The solution was cooled to room temperature and 1 gram of methyl methacrylate, 2 grams of N-methylacrylamide and 0.05 gram of benzoyl peroxide were added. The reaction mixture was then heated at 50° C. for an additional 16 hours. The resulting polymer was soluble in the reaction mixture. The polymer was precipitated by pouring the solution into water and a yield of 93 percent was obtained. The polymer contained 17 percent by weight of N-methylacrylamide on analysis. Fibers spun by extruding a solution of the polymer product obtained above in N,N-dimethylacetamide into a precipitating bath had a softening point of 195° C. and showed excellent affinity for dyes.

Example 6

8 grams of acrylonitrile were emulsified in 100 cc. of distilled water containing 3 grams of an aryloxypolyalkylene sulfonated ether type of emulsifying agent, 0.1 gram of ammonium persulfate and 0.1 gram of sodium bisulfite. The emulsion was tumbled at 50° C. for 12 hours. After cooling to room temperature, 1 gram of vinyl acetate, 1 gram of methyl methacrylate, 0.02 gram of ammonium persulfate and 0.02 gram of sodium bisulfite were added. The resulting emulsion was then tumbled at 50° C. for an additional 8 hours. The precipitated polymer weighed 9.7 grams (97 percent yield) and contained 9 percent by weight of methyl methacrylate and 10 percent by weight of vinyl acetate on analysis. Fibers spun by extruding a solution of the polymer product in N,N-dimethylformamide into a precipitating bath had a softening point of 195° C. and showed good dye affinity.

Example 7

7 grams of acrylonitrile were emulsified in 80 cc. of distilled water containing 3 grams of potassium laurate, 0.1 gram of ammonium persulfate, 0.1 gram of sodium bisulfite. The resulting emulsion was then tumbled at 50° C. for 6 hours. After cooling to room temperature, a dispersion of 2 grams vinyl acetate, 1 gram of isopropenyl acetate in 20 cc. of distilled water containing 0.02 gram of ammonium persulfate, 0.02 gram of sodium bisulfite and 1 gram of potassium laurate were added. The dispersion was tumbled end over end at 50° C. for an additional 12 hours. The precipitated polymer weighed 9.4 grams and contained 9 percent by weight of isopropenyl acetate and 17 percent by weight of vinyl acetate on analysis. Fibers spun by extruding a solution of the polymer product in N,N-dimethylformamide into a precipitating bath had a softening point of 200° C. and showed good dye affinity.

Example 8

5 grams of acrylonitrile were emulsified in 50 milliliters of water containing 1 gram of 7-ethyl-2-methyl undecane-4-sulfonic acid sodium salt (Tergitol 4), 0.05 gram of ammonium persulfate and 0.05 gram of sodium bisulfite. The emulsion was heated for 8 hours at 35° C. After cooling to room temperature, 3 grams of methyl-acetaminoacrylate, 2 grams of acrylonitrile, 0.05 gram of ammonium persulfate and 0.05 gram of sodium bisulfite were added. Polymerization was completed by heating at 35° C. for an additional 8 hours. The resulting polymer was obtained in a 93 percent yield and contained 29 percent by weight of methyl-acetaminoacrylate. Fibers spun by extruding a solution of this polymer product in N,N-dimethylformamide into a precipitating bath had a softening bath of 230° C. and showed excellent affinity for dyes.

Example 9

6 grams of acrylonitrile were emulsified in 75 cc. of distilled water containing 1.5 grams of 7-ethyl-2-methyl undecane-4-sulfonic acid sodium salt (Tergitol No. 4), 0.05 gram of potassium persulfate and 0.05 gram of sodium bisulfite. The resulting emulsion was heated for 6 hours at 35° C. and cooled to room temperature. Then 1 gram of acrylonitrile, 3 grams of N-methyl methacrylamide, 0.04 gram of potassium bisulfite and 0.04 gram of ammonium persulfate were added. The polymerization was completed by heating at 35° C. for an additional 8 hours. The precipitated product was then filtered off, washed several times in fresh portions of distilled water and dried. There was thus obtained 6.3 grams of polymer containing 16 percent by weight of N-methyl methacrylamide. Fibers prepared from this polymer had a high softening point and showed excellent affinity for dyes.

Example 10

1 gram of acrylonitrile was emulsified in 50 cc. of distilled water containing 1 gram of an aryloxypolyalkylene sulfonated ether type of emulsifing agent, 0.01 gram potassium persulfate and 0.01 gram of sodium bisulfite. The resulting emulsion was heated for 5 hours at 35° C. To the cooled reaction mixture, 5 grams of N-isopropyl methacrylamide, 1 gram of N,N'-dimethylitaconamide, 0.1 gram of sodium bisulfite were added. The polymerization was completed by heating at 35° C. for an additional 16 hours. The product was filtered off, washed with distilled water and dried. The dried product contained 16.1 percent by weight of acrylonitrile and a stable homogeneous solution resulted when the product was dissolved in N,N-dimethylacetamide containing polyacrylonitrile.

Example 11

7 grams of acrylonitrile were emulsified in 90 milliliters of water containing 2 grams of a sulfonated ether type of emulsifying agent, 0.1 gram of ammonium persulfate and 0.1 gram of sodium bisulfite. The resulting emulsion was heated at 35° C. for 12 hours. The emulsion was then cooled to room temperature and 2.5 grams of fumaramide, .5 gram of acrylonitrile, 0.05 gram of ammonium persulfate and 0.05 gram of sodium bisulfite were then added. The polymerization was completed by heating at 35° C. for 12 hours. The precipitated polymer was obtained in an 88 percent yield and contained 21 percent by weight of fumaramide. Fibers spun by extruding a solution of the polymer product in N,N-dimethylformamide into a precipitating bath had a softening temperature of 210° C. and showed excellent affinity for dyes.

Example 12

7 grams of acrylonitrile were emulsified in 80 milliliters of water containing 1 gram of orthophosphoric acid, 2 grams of an aryloxypolyalkylene sulfonated ether type of emulsifying agent, 0.1 gram of potassium persulfate and 0.1 gram of sodium bisulfite. The polymerization was carried out by heating the reaction mixture at 25° C. for 8 hours. 1 gram of acrylonitrile and 2 grams of N,N'-dimethylfumaramide were then added to the emulsion and the polymerization completed by heating at 50° C. for 12 hours. The precipitated polymer was obtained in a 90 percent yield and contained 18 percent by weight of N,N'-dimethylfumaramide. Fibers spun by extruding a solution of the polymer product in N,N-dimethylformamide into a precipitating bath had a softening point of 220° C. and showed excellent dye susceptibility.

Example 13

8 grams of acrylonitrile were emulsified in 95 milliliters of water containing 0.5 gram of oxalic acid, 2 grams of an aryloxypolyalkylene sulfonated ether, and 0.1 gram (calculated as 100 percent) hydrogen peroxide were added. The emulsion was heated for 16 hours at 50° C. The emulsion was cooled to room temperature and 1 gram of N, N, N'N'-tetramethylfumaramide, 1 gram of N,N-dimethylacrylamide and 0.05 gram (calculated as 100 percent) of hydrogen peroxide were added. The polymerization was completed by heating at 50° C. for 12 hours. The precipitated polymer was obtained in an 85 percent yield and contained 8.2 percent by weight of N,N'N'-tetramethylfumaramide and 9 percent by weight of N,N-dimethylacrylamide. Fibers spun by extruding a solution of the polymer product in N,N-dimethylformamide into a precipitating bath had a softening point of 210° C. and showed excellent affinity for dyes.

The polymer can be mixed with polyacrylonitrile in all proportions and dissolved to give stable solutions which do not separate into distinct layers on standing and from which fibers and films of homogeneous character can be spun, extruded or cast.

Example 14

7.5 grams of acrylonitrile were emulsified in 100 cc. of distilled water containing 0.1 gram of ammonium persulfate, 0.1 gram of sodium bisulfite and 3 grams of potassium laurate. The solution was heated at 40° C. for 8 hours, at the end of which time the solution was cooled to room temperature. There were then added 1 gram of N,N'-di-isopropylfumaramide, 1.5 grams of N,N'-diethylmaleamide, 0.05 gram of ammonium persulfate, 0.05 gram of sodium bisulfite and 1 gram of potassium laurate. The reaction mixture was heated an additional 12 hours at 35° C. The precipitated polymer was obtained in 92 percent yield and contained approximately 20.5 percent by weight of the fumaramide and maleamide. Fibers spun by extruding a solution of the polymer product in N,N-dimethylformamide into a precipitating bath had a softening point of 225° C. and showed good affinity for dyes.

Example 15

7 grams of acrylonitrile were dissolved in 50 cc. of N,N-dimethylformamide containing 0.1 gram of benzoyl peroxide. The solution was heated at 50° C. for 16 hours. 1 gram of methyl methacrylate, 2 grams of N,N'-dimethylmaleamide and 0.05 gram of benzoyl peroxide were then added to the cooled solution. The polymerization was completed by heating at 50° C. for an additional 16 hours. The resulting polymer was soluble in the N,N-dimethylformamide. The polymer was precipitated by pouring the solution into water and the polymer product was obtained in a 93 percent yield and contained 17 percent by weight of N,N'-dimethylmaleamide on analysis. Fibers spun by extruding a solution of the polymer product obtained above in N,N-dimethylacetamide into a precipitating bath had a softening point of 220° C. and showed excellent affinity for dyes.

The polymer can be mixed with polyacrylonitrile in all proportions and dissolved to give stable solutions which do not separate into distinct layers on standing and from which fibers and films of homogeneous character can be spun, extruded or cast.

Example 16

8 grams of acrylonitrile were emulsified in 90 cc. of water containing 2 grams of a sulfonated ether type of emulsifying agent, 0.1 gram of ammonium persulfate and 0.1 gram of sodium bisulfite. The resulting emulsion was heated at 50° C. for 8 hours. After cooling to room temperature, a dispersion of 1 gram of vinyl acetate, 1 gram of N-methyl methylfumaramate suspended in 10 cc. of distilled water containing 0.02 gram of ammonium persulfate, 0.02 gram of sodium bisulfite and 1 gram of a sulfonated ether type of emulsifying agent were added. The reaction mixture was then tumbled at 50° C. for 12 hours. The precipitated polymer weighed 9.8 grams and contained 9.2 percent by weight of N-methylfumaramate and 10 percent by weight of vinyl acetate on analysis. Fibers spun by extruding a solution of the polymer product in N,N-dimethylformamide into a precipitating bath had a softening point of 215° C. and showed good dye affinity.

The polymer can be mixed with polyacrylonitrile in all proportions and dissolved to give stable solutions which do not separate into distinct layers on standing and from which fibers and films of homogeneous character can be spun, extruded or cast.

Example 17

7 grams of acrylonitrile were dispersed in 70 milliliters of distilled water containing 2 grams of a sulfonated ether type of emulsifying agent, 0.1 gram of ammonium persulfate and 0.1 gram of sodium bisulfite. The resulting emulsion was then heated at 35° C. for 16 hours. After cooling to room temperature, a dispersion of 2 grams of N,N-dimethylmethylfumaramate, 1 gram of methyl fumaramate suspended in 20 cc. of distilled water containing 0.02 gram of ammonium persulfate, 0.02 gram of sodium bisulfite and 1 gram of a sulfonated ether type of emulsifying agent was added. The dispersion was tumbled end over end at 50° C. for an additional 12 hours. The precipitated polymer weighed 9.4 grams and contained 26 percent by weight of the fumaramates by analysis. Fibers spun by extruding a solution of the polymer product in N,N-dimethylformamide into a precipitating bath had a softening point of 210° C. and showed good dye affinity.

*Example 18*

5 grams of acrylonitrile were emulsified in 75 cc. of distilled water containing 2 grams of a sulfonated ether type of emulsifying agent, 0.05 gram of ammonium persulfate and 0.05 gram of sodium bisulfite. The reaction mixture was then heated at 35° C. for 8 hours. After cooling to room temperature, 3 grams of methyl-α-acetaminoacrylate, 2 grams of N-methyl methylmaleamate 0.05 gram of ammonium persulfate and 0.05 gram of sodium bisulfite were added and heating was continued for an additional 12 hours at 35° C. The resulting polymer was obtained in a 94 percent yield and contained 28.5 percent by weight of methyl-α-acetaminoacrylate on analysis. Fibers spun by extruding a solution of this polymer product in N,N-dimethylformamide into a precipitating bath had a softening point of 235° C. and showed excellent affinity for dyes.

*Example 19*

6 grams of acrylonitrile were emulsified in 50 cc. of distilled water containing 2 grams of potassium laurate, 0.06 gram of potassium persulfate. The resulting emulsion was heated for 6 hours at 45° C. Then 1 gram of acrylonitrile, 3 grams of N,N-methyl itaconamate were emulsified in 10 cc. of distilled water containing 0.04 gram of potassium bisulfite, 0.04 gram of ammonium persulfate and 1 gram of potassium laurate were added. The reaction mixture was then heated an additional 16 hours at 35° C. The precipitated product was then filtered off, washed several times with fresh sources of distilled water and dried. There was thus obtained 6.5 grams of polymer containing 16 percent by weight of n-methyl methyl itaconamate. Fibers prepared from this polymer had a softening point of 210° C. and showed good dye affinity.

*Example 20*

1 gram of acrylonitrile was emulsified or dissolved in N,N-dimethylacetamide containing 0.1 gram of benzoyl peroxide. The resulting solution was heated for 8 hours at 50° C. and cooled to room temperature. There was then added 5 grams of N-isopropyl methacrylamide, 1 gram of N,N-dimethyl methyl itaconamate and 0.1 gram of benzoyl peroxide. The reaction was heated for an additional 12 hours at 50° C. The resulting product was soluble in the N,N-dimethylacetamide. The polymer was isolated by pouring the solution into water. The dried product contained 16.2 percent by weight of acrylonitrile and a stable homogeneous solution resulted when the product was dissolved in N,N-dimethylacetamide containing polyacrylonitrile.

*Example 21*

2 grams of acrylonitrile were emulsified in 75 cc. of distilled water containing 4 grams of a sulfonated ether type of emulsifying agent, 0.01 gram of ammonium persulfate and 0.01 gram of sodium bisulfite. The resulting emulsion was heated at 50° C. for 6 hours. After cooling to room temperature, 5 grams of N-isopropyl ethyl itaconamate, 5 grams of methyl citriconamate, 0.1 gram of ammonium persulfate and 0.1 gram of sodium bisulfite were added. The reaction mixture was then tumbled end over end for 12 hours at 50° C. The product was filtered off, washed with water and dried. It contained 5.9 percent by weight of acrylonitrile on analysis and formed homogeneous solutions in N,N-dimethylformamide with polyacrylonitrile.

*Example 22*

23 grams of acrylonitrile were emulsified in 150 milliliters of water containing 4 cc. of 7-ethyl-2-methyl undecane-4-sulfonic acid sodium salt (Tergitol No. 4), 0.23 gram of ammonium persulfate, 0.23 gram of sodium bisulfite and 1.35 grams of 85 percent phosphoric acid. After tumbling the reaction mixture in a crown-capped bottle for 20 hours in a water bath heated at 35° C., the resulting emulsion was cooled to room temperature and 8 grams of N-methyl isopropyl citriconamate, 2 grams of acrylonitrile, 0.1 gram of ammonium persulfate and 0.1 gram of sodium metabisulfite were added. The reaction mixture was then heated for an additional 8 hours at 35° C. with tumbling, cooled to room temperature, and the polymer product precipitated by the addition of a saturated sodium chloride solution to the reaction vessel. The polymer was filtered off, washed twice with hot water and then dried. The yield amounted to 31.3 grams and the product was found to contain 23 percent by weight of N-methyl isopropyl citriconamate on analysis. It gave homogeneous solution in N,N-dimethylformamide.

*Example 23*

7 grams of acrylonitrile were emulsified in 100 cc. of distilled water containing 3 grams of potassium laurate, 0.1 gram of potassium persulfate and 0.1 gram of sodium bisulfite. The emulsion was then heated at 35° C. for 8 hours. There was then added 1 gram of acrylonitrile and 2 grams of citraconamide along with 0.05 gram of potassium persulfate. Polymerization was completed by heating at 50° C. for an additional 12 hours. The precipitated polymer was obtained in a 93 percent yield and contained 19.5 percent by weight citraconamide on analysis. Fibers spun by extruding a solution of the polymer product in dimethylformamide into a precipitating bath had a softening temperature of 215° C. and showed excellent dye susceptibility.

The preceding description and examples have set forth that the resinous compositions or polymers of the invention which contain from 60 to 95 percent by weight of acrylonitrile in the polymer molecule are especially useful for preparing fibers from their solutions or dopes in the mentioned solvents by wet or dry spinning processes. Good quality fibers can also be spun from dopes comprising a mixture of one or more of the resinous compositions of the invention with polyacrylonitrile, when used in such proportions that the combined total of acrylonitrile in the mixture of components is in the range of 60 to 95 percent by weight. However, all of the resinous compositions or polymers of the invention, containing from 5 to 95 percent of acrylonitrile, including the mixtures of them with polyacrylonitrile in any proportions but preferably in the proportions of from 5 to 95 parts by weight of one or more of the polymers of the invention and from 95 to 5 parts by weight of polyacrylonitrile, can be made up into solutions or dopes with one or more arcylonitrile polymer solvents, with or without added fillers, pigments, dyes, plasticizers, etc., as desired, and the dopes coated onto a smooth surface to give flexible and tough films and sheet materials, which are useful for photographic film support and other purposes.

Other solvents which can be used for the preparation of fibers and coating compositions, etc. from the new resinous compositions or polymers of the invention, and mixtures thereof with polyacrylonitrile, include ethylene carbamate, ethylene carbonate, γ-butyrolactone, N-methyl-2-pyrrolidone, N,N-dimethyl methoxyacetamide, dimethyl cyanamide, N,N-dimethyl cyanoacetamide, N,N- dimethyl-β-cyanopropionamide, glycolonitrile (formaldehyde cyanohydrin), malonitrile, ethylene cyanohydrin, dimethylsulfoxide, dimethyl sulfone, tetramethylene sulfone, tetramethylene sulfoxide, N-formyl pyrrolidine, N-formyl morpholine, N,N'-tetramethylene methanephosphonamide, and the like. Generally speaking, we have found that N,N-dimethyl formamide and N,N-dimethyl acetamide are particularly advantageous solvents. The amount of polymer in the solvent for best spinning conditions can vary from about 5 to 30 percent, although higher concentrations are possible.

What I claim is:

1. A process for preparing a resinous composition containing at least 60% by weight of acrylonitrile and at least 5% by weight of an N-alkyl substituted acrylamide represented by the general formula:

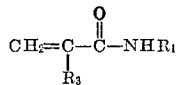

wherein $R_1$ represents an alkyl group containing from 1 to 4 carbon atoms and $R_3$ represents a member selected from the group consisting of a hydrogen atom and a methyl group, which comprises heating in the presence of a peroxide polymerization catalyst a dispersion comprising from 5 to 95 parts by weight of acrylonitrile as the sole polymerizable substituent and a vehicle consisting of water, until the acrylonitrile has substantially completely homopolymerized, adding to the said dispersion containing the unseparated homopolymer from 95 to 5 parts by weight of a mixture of monomers consisting of from 5 to 95% by weight of the said N-alkyl acrylamide and from 95 to 5% by weight of acrylonitrile, and heating the resulting mixture until the said added monomers have substantially polymerized.

2. A process for preparing a resinous composition containing at least 60% by weight of acrylonitrile and at least 5% by weight of N-methyl methacrylamide, which comprises heating in the presence of a peroxide polymerization catalyst a dispersion comprising from 5 to 95 parts by weight of acrylonitrile as the sole polymerizable substituent and a vehicle consisting of water, until the acrylonitrile has substantially completely homopolymerized, adding to the said dispersion containing the unseparated homopolymer from 95 to 5 parts by weight of a mixture of monomers consisting of from 5 to 95% by weight of N-methyl methacrylamide and from 95 to 5% by weight of acrylonitrile, and heating the resulting mixture until the added monomers have substantially polymerized.

3. A process for preparing a resinous composition containing at least 60% by weight of acrylonitrile and at least 5% by weight of N-methyl acrylamide which comprises heating in the presence of a peroxide polymerization catalyst a dispersion comprising from 5 to 95 parts by weight of acrylonitrile as the sole polymerizable substituent and a vehicle consisting of water, until the acrylonitrile has substantially completely homopolymerized, adding to the said dispersion containing the unseparated homopolymer from 95 to 5 parts by weight of a mixture of monomers consisting of from 5 to 95% by weight of N-methyl acrylamide and from 95 to 5% by weight of acrylonitrile, and heating the resulting mixture until the added monomers have substantially polymerized.

4. A process for preparing a resinous composition containing about 76% by weight of acrylonitrile and 24% by weight of N-methyl methacrylamide, which comprises heating in the presence of a peroxide polymerization catalyst a dispersion comprising 70 parts by weight of acrylonitrile as the sole polymerizable substituent and a vehicle consisting of water, until the acrylonitrile has substantially completely homopolymerized, adding to the said dispersion containing the unseparated homopolymer 25 parts by weight of N-methyl methacrylamide and 5 parts by weight of acrylonitrile, and heating the resulting mixture until the added N-methyl methacrylamide and acrylonitrile have substantially polymerized.

5. A process for preparing a resinous composition containing about 82% by weight of acrylonitrile and 18% by weight of N-methyl acrylamide, which comprises heating in the presence of a peroxide polymerization catalyst a dispersion comprising 70 parts by weight of acrylonitrile as the sole polymerizable substituent and a vehicle consisting of water, until the acrylonitrile has substantially completely homopolymerized, adding to the said dispersion containing the unseparated homopolymer 20 parts by weight of N-methyl acrylamide and 10 parts by weight of acrylonitrile, and heating the resulting mixture until the added N-methyl acrylamide and acrylonitrile have substantially polymerized.

References Cited in the file of this patent

UNITED STATES PATENTS

| | | |
|---|---|---|
| 2,538,779 | Harrison | Jan. 23, 1951 |
| 2,598,316 | Tawney | May 27, 1952 |
| 2,614,089 | Harrison | Oct. 14, 1952 |
| 2,649,434 | Coover et al. | Aug. 18, 1953 |
| 2,657,191 | Coover et al. | Oct. 27, 1953 |
| 2,666,025 | Nozaki | Jan. 12, 1954 |
| 2,666,042 | Nozaki | Jan. 12, 1954 |

FOREIGN PATENTS

| | | |
|---|---|---|
| 999,594 | France | Oct. 3, 1951 |
| 818,693 | Germany | Oct. 25, 1951 |
| 679,562 | Great Britain | Sept. 17, 1952 |